US012573302B2

(12) United States Patent
Nordbruch

(10) Patent No.: US 12,573,302 B2
(45) Date of Patent: Mar. 10, 2026

(54) METHOD FOR INFRASTRUCTURE-SUPPORTED ASSISTING OF A MOTOR VEHICLE

(71) Applicant: Robert Bosch GmbH, Stuttgart (DE)

(72) Inventor: Stefan Nordbruch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 262 days.

(21) Appl. No.: 18/157,979

(22) Filed: Jan. 23, 2023

(65) Prior Publication Data

US 2023/0245567 A1 Aug. 3, 2023

(30) Foreign Application Priority Data

Feb. 2, 2022 (DE) ..................... 10 2022 201 090.6

(51) Int. Cl.
| | |
|---|---|
| *G08G 1/00* | (2006.01) |
| *B60W 30/00* | (2006.01) |
| *B60W 30/095* | (2012.01) |
| *B60W 60/00* | (2020.01) |
| *G08G 1/09* | (2006.01) |
| *G08G 1/16* | (2006.01) |

(52) U.S. Cl.
CPC ......... *G08G 1/168* (2013.01); *B60W 30/0956* (2013.01); *B60W 60/0015* (2020.02); *G08G 1/091* (2013.01); *G08G 1/166* (2013.01); *B60W 2556/50* (2020.02)

(58) Field of Classification Search
CPC ........ G08G 1/168; G08G 1/091; G08G 1/166; B60W 60/0015; B60W 30/0956; B60W 2556/50
See application file for complete search history.

(56) References Cited

U.S. PATENT DOCUMENTS

| | | | | |
|---|---|---|---|---|
| 2017/0132482 A1* | 5/2017 | Kim | .......................... | B60R 1/27 |
| 2019/0276010 A1* | 9/2019 | Mason | ................. | G05D 1/0212 |

FOREIGN PATENT DOCUMENTS

| | | |
|---|---|---|
| DE | 10346336 A1 | 4/2005 |
| DE | 102004011281 A1 | 9/2005 |
| DE | 102010063801 A1 | 6/2012 |

(Continued)

*Primary Examiner* — Wade Miles
*Assistant Examiner* — Aaron G Cain
(74) *Attorney, Agent, or Firm* — NORTON ROSE FULBRIGHT US LLP

(57) ABSTRACT

A method for the infrastructure-supported assistance of a motor vehicle during a trip guided in at least partially automated fashion within a parking facility. The method includes: receiving area signals representing an area of the parking facility at an instantaneous time; comparing the area to a reference area associated with the area to recognize a change between the area and the reference area; detecting an object located in the area, if a change is recognized between the area and the reference area, where, if an object situated in the area is detected, its existence is checked for plausibility; ascertaining infrastructure assistance data for infrastructure-supported assisting of the motor vehicle for a trip guided in at least partially automated fashion through the area, based on the checking of the existence of the object for plausibility; outputting infrastructure assistance data signals that represent the ascertained infrastructure assistance data.

5 Claims, 4 Drawing Sheets

(56)          References Cited

FOREIGN PATENT DOCUMENTS

| | | | |
|---|---|---|---|
| DE | 102014202752 | A1 | 9/2015 |
| DE | 112015002774 | T5 | 3/2017 |
| DE | 102017200727 | A1 | 7/2018 |
| GB | 2486814 | A | 6/2012 |
| WO | 2015190051 | A1 | 12/2015 |

* cited by examiner receive area signals — 101 compare area to reference area — 103 detect object — 105 check for plausibility — 107 ascertain infrastructure assistance data — 109 output infrastructure assistance data signals — 111 device configured to carry out steps — 201 machine-readable storage medium computer program

— 301

303

METHOD FOR INFRASTRUCTURE-SUPPORTED ASSISTING OF A MOTOR VEHICLE

CROSS REFERENCE

The present application claims the benefit under 35 U.S.C. § 119 of German Patent Application No. DE 10 2022 201 090.6 filed on Feb. 2, 2022, which is expressly incorporated herein by reference in its entirety.

FIELD

The present invention relates to a method for the infrastructure-supported assisting of a motor vehicle during a trip guided in at least partially automated fashion within a parking facility, and to a device, a computer program, and a machine-readable storage medium.

BACKGROUND INFORMATION

AVP stands for "Automated Valet Parking."

A safety-based approach to AVP can be that with the start of and during each AVP operation, the area around the motor vehicle and route is scanned for objects and especially people, for safety reasons.

A corresponding environment analysis can be carried out as follows: Environmental sensors (e.g., lidar, video/camera) check a known scene for changes, e.g. with regard to its appearance and/or a distance from the environmental sensor to a wall, floor, and/or a reference surface.

If there is a change, then it can be inferred that an object is present and the AVP process must not be started, or must be stopped.

The analysis begins with the start of and during the AVP process.

Great Britain Patent Application No. GB 2486814 A describes a method for assisting a driver of a vehicle.

German Patent Application No. DE 11 2015 002 774 T5 of the international application with publication number WO 2015/190051 describes a driving assistance device.

SUMMARY

An object of the present invention is to provide efficient infrastructure-supported assistance of a motor vehicle during a trip guided in at least partially automated fashion within a parking facility.

This object may be achieved by features of the present invention. Advantageous embodiments of the present invention are disclosed herein.

According to a first aspect of the present invention, a method is provided for infrastructure-assisted driving of a motor vehicle during a trip guided in at least partially automated fashion within a parking facility. According to an example embodiment of the present invention, the method comprises the following steps:

Receiving area signals representing an area of the parking facility at an instantaneous time, Comparing the area to a reference area associated with the area to recognize a change between the area and the reference area, Detecting an object located in the area, if a change is recognized between the area and the reference area, where, if an object situated in the area is recognized, its existence is checked for plausibility, Ascertaining infrastructure assistance data for infrastructure-supported assisting of the motor vehicle for a trip guided in at least partially automated fashion through the area based on the checking of the existence of the object for plausibility and based on the detected object, Outputting infrastructure assistance data signals representing the ascertained infrastructure assistance data.

According to a second aspect of the present invention, a device is provided that is set up to perform all the steps of the method according to the first aspect of the present invention.

According to a third aspect of the present invention, a computer program is provided having instructions that, when the computer program is executed by a computer, for example by the device according to the second aspect of the present invention, cause the computer to execute a method according to the first aspect of the present invention.

According to a fourth aspect of the present invention, a machine-readable storage medium is provided on which the computer program according to the third aspect of the present invention is stored.

The present invention is based on and includes the recognition that the above object can be achieved by checking an existence of a detected object for plausibility before the detected object is used to ascertain infrastructure assistance data. This results, for example, in the technical advantage that it can be efficiently ensured, with a high degree of probability, that the detected object is a real object. Thus, corresponding infrastructure assistance data for infrastructure-supported assistance of the motor vehicle for a trip guided in at least partially automated fashion through the area can be ascertained efficiently, so that the motor vehicle, for example, can drive safely through the area in an advantageous manner. For example, the motor vehicle can be guided around the detected object with infrastructure support. For example, the motor vehicle can stop with infrastructure support.

In this way, a risk of a collision between the motor vehicle and the detected object can advantageously be efficiently reduced.

If the plausibility check shows that the detected object is not a real object, the vehicle for example does not have to stop or take an evasive route. In this way, for example, an efficient operation of the parking facility can be advantageously ensured.

In particular, this can advantageously ensure AVP functionality of the parking facility. AVP stands for "Automated Valet Parking."

Thus, in particular, a technical advantage is brought about that a design is provided for efficient infrastructure-supported assisting of a motor vehicle during a trip guided in at least partially automated fashion within a parking facility.

In one embodiment of the present invention, it is provided that checking area signals are received that represent one or more checking areas of the parking facility at an older time, the checking of the existence of the object for plausibility including an ascertaining of whether the detected object was, at the older time, in the one further checking area, or in at least one of the plurality of checking areas, of the parking facility.

This confers the technical advantage, for example, that the plausibility check can be carried out efficiently. If the detected object was not in the checking area or in at least one of the plurality of checking areas of the parking facility at the older time, it is very improbable that the detected object is a real object. In particular, it is, conversely, true that if, at the older time, the detected object was in the checking area and in at least one of the plurality of checking areas of the parking facility, then in this case the detected object is very probably a real object.

In particular, according to an example embodiment of the present invention, it is determined that if the detected object was in the checking area or in at least one of the plurality of checking areas of the parking facility at the older time, then the detected object is a real object.

In particular, according to an example embodiment of the present invention, it is determined that if the detected object was not in the checking area or in at least one of the plurality of checking areas of the parking facility at the older time, then the detected object is not a real object.

The older time is defined relative to the current time.

According to one specific embodiment of the present invention, it is provided that ascertaining whether the detected object was, at the older time, in the one checking area or in at least one of the plurality of checking areas of the parking facility includes comparing each of the one or more checking areas with a reference checking area associated with the respective checking area, in order to detect a change between the respective checking area and the respective reference checking area, and if, based on a recognition of a change between the respective checking area and the respective reference checking area, a further object located in the respective checking area is detected, the further object is compared to the object in order to ascertain whether the further object is the object.

This results, for example, in the technical advantage that ascertaining whether the detected object was in the checking area or in at least one of the plurality of checking areas of the parking facility at the older time can be carried out efficiently.

Thus, according to this embodiment of the present invention, it is provided that this ascertaining is carried out analogously to the detection of an object located in the area.

Statements made in connection with the area apply analogously to the checking area or plurality of checking areas, and vice versa.

It is to be noted that the design described here can be applied to a multiplicity of areas of the parking facility.

According to one specific embodiment of the present invention, if the object is in the immediate vicinity of a parked motor vehicle then the checking of the existence of the object for plausibility is carried out based on a parking duration of the parked motor vehicle, the parking duration indicating how long the motor vehicle has already been parked and/or will continue to be parked.

This brings about the technical advantage, for example, that the checking of the existence of the object for plausibility can be carried out efficiently.

In the case of a motor vehicle that has been parked for a long time, for example a predetermined minimum parking period, it is very improbable that a person will get out of the motor vehicle and be situated in the immediate vicinity of the parked motor vehicle, to then be detected as an object.

If, for example, a parking duration of the motor vehicle is about to end, for example at the end of a predetermined maximum parking time, the detected object may be a driver of the motor vehicle who wants to move his motor vehicle out of the parked position. In this case, the detected object is, with a high probability, a real detected object.

According to one specific embodiment of the present invention, it is provided that the checking of the existence of the object for plausibility is performed based on opening times, and/or door opening times of an entry gate, of the parking facility.

This brings about the technical advantage, for example, that the checking of the existence of the object for plausibility can be carried out efficiently.

For example, in a closed parking facility, it is very unlikely that an object will suddenly be detected inside the parking facility that was not previously there. For example, it is unlikely that an object will be detected that was not previously detected even though the parking facility entrance gate was not opened. This is because in such a case no motor vehicle can enter the parking facility to be detected as an object.

In one specific embodiment of the present invention, it is provided that the object is classified, the infrastructure assistance data being ascertained based on the classification. This brings about, e.g., the technical advantage that an important item of information about the object, the classification type, is available. For example, the object can be classified as follows: motor vehicle, pedestrian, cyclist, collision object, and non-collision object.

According to one specific embodiment of the present invention, the checking of the existence for plausibility is carried out based on the classification.

This confers the technical advantage, for example, that the plausibility check can be carried out efficiently.

According to one specific embodiment of the present invention, it is provided that the steps of receiving area signals, comparing the area with a reference area assigned to the area, detecting an object located in the area if a change between the area and the reference area is detected, and checking the existence of an object located in the area for plausibility are repeated permanently, in particular 24 hours a day, in particular 7 days a week, and in particular 365 days a year, independently of whether a motor vehicle is to be assisted with infrastructure support during a trip within the parking facility guided in at least partially automated fashion.

This confers the technical advantage, for example, that the plausibility check can be carried out efficiently. This is because, due to the repetition of these steps as defined above, independently of whether a motor vehicle is to be assisted with infrastructure support during a trip guided in at least partially automated fashion within the parking facility, a large amount of data is advantageously available in order to enable the plausibility check to be performed. Such data includes, for example, the checking area signals referred to above, which represent one or more checking areas of the parking facility at an older time.

"Permanently" in the sense of the present description means, for example, 24 hours a day, 7 days a week, and 365 days a year.

"Permanently" in the sense of the present description thus means, for example, in an ongoing or continuous manner.

In one specific embodiment of the present invention, it is provided that one or more environmental sensors are spatially distributed, and in particular in stationary fashion, within the parking facility.

Such environmental sensors are set up, for example, to acquire the area and/or the checking areas and to output area signals and/or checking area signals corresponding to the acquisition.

In one specific embodiment of the present invention, the method includes a step of the acquiring of the area by one environmental sensor or by a plurality of environmental sensors of the parking facility, and outputting area signals corresponding to the acquisition.

In one specific embodiment of the present invention, the method comprises a step of the acquiring of one or more checking areas by one or more environmental sensors of the parking facility and a step of outputting checking area signals corresponding to the acquisition.

In one specific embodiment of the present invention, it is provided to send the output infrastructure assistance data signals to the motor vehicle, in particular to send them via a communication network. The communication network includes, for example, a WLAN communication network and/or a mobile radiotelephone network.

An infrastructure-supported assisting of the motor vehicle means, in particular, that infrastructure assistance data is made available to the motor vehicle. Based on the infrastructure assistance data, the motor vehicle can, for example, derive instructions for action. For example, the motor vehicle can itself decide what to do based on the infrastructure assistance data.

For example, infrastructure assistance data include one or more of the following elements of data: control command for at least partially automated control of transverse and/or longitudinal guidance of the motor vehicle, remote control command for at least partially automated remote control of transverse and/or longitudinal guidance of the motor vehicle, release command for releasing at least partially automated, in particular fully automated, travel of the motor vehicle for a specific time in a specific area of the parking facility, target trajectory for the motor vehicle, target position within the parking facility, environmental data representing an environment of the motor vehicle, specification of what the motor vehicle is to do. The specification specifies, for example, whether the motor vehicle may drive or must stop.

A trip of the motor vehicle guided in at least partially automated fashion is, for example, an AVP trip of the motor vehicle. AVP stands for "Automated Valet Parking." In the context of an AVP trip, the motor vehicle is guided, for example, from a first position to a parking position in an at least partially automated manner, is parked at the parking position in an at least partially automated manner, leaves the parked position in an at least partially automated manner after a parking time has elapsed or in response to a retrieval request, and is guided to a second position in an at least partially automated manner. At the first position, a driver of the motor vehicle parks his motor vehicle, for example. The AVP process begins there. At the second position, the driver retrieves his motor vehicle, for example. The AVP process ends there. The first and second positions may be different or may be identical.

A trip of the motor vehicle guided in at least partially automated fashion within the parking facility is an infrastructure-assisted trip of the motor vehicle, and is therefore a trip guided in at least partially automated fashion in which the motor vehicle receives support or assistance from the infrastructure assistance data ascertained in an infrastructure.

The phrase "at least partially automated driving" includes one or more of the following: assisted driving, partially automated driving, highly automated driving, fully automated driving. Thus, the phrase "at least partially automated" includes one or more of the following phrases: assisted, partially automated, highly automated, fully automated.

Assisted driving means that a driver of the motor vehicle permanently executes either lateral or longitudinal guidance of the motor vehicle. The other driving task (i.e., controlling the longitudinal or lateral guidance of the motor vehicle) is performed automatically. This means, therefore, that during assisted driving of the motor vehicle, either lateral or longitudinal guidance is automatically controlled.

Partially automated driving means that in a specific situation (for example: driving on a highway, driving within a parking facility, overtaking an object, driving inside a lane defined by lane markings) and/or for a certain period of time, a longitudinal and a lateral guidance of the motor vehicle are controlled automatically. A driver of the motor vehicle does not have to manually control the longitudinal and lateral guidance of the motor vehicle himself. However, the driver must constantly monitor the automatic controlling of the longitudinal and lateral guidance in order to be able to intervene manually when necessary. The driver must be prepared to completely take over the guidance of the motor vehicle at all times.

Highly automated driving means that in a specific situation (for example: driving on a highway, driving within a parking facility, overtaking an object, driving inside a lane defined by lane markings) a longitudinal and a lateral guidance of the motor vehicle are controlled automatically. A driver of the motor vehicle does not have to manually control the longitudinal and lateral guidance of the motor vehicle himself. The driver does not have to constantly monitor the automatic controlling of the longitudinal and lateral guidance in order to be able to intervene manually if necessary. If necessary, a takeover request is automatically issued, in particular with a sufficient time reserve, to the driver to take over control of the longitudinal and lateral guidance. The driver must therefore potentially be able to take over the longitudinal and lateral guidance. Limits of the automatic controlling of the transverse and longitudinal guidance are automatically recognized. In highly automated driving, it is not possible in every initial situation to automatically bring about a minimum-risk state.

Fully automated driving means that in a specific situation (for example: driving on a highway, driving within a parking facility, overtaking an object, driving inside a lane defined by lane markings) a longitudinal and a lateral guidance of the motor vehicle are controlled automatically. A driver of the motor vehicle does not have to manually control the longitudinal and lateral guidance of the motor vehicle himself. The driver does not have to monitor the automatic controlling of the longitudinal and lateral guidance in order to be able to intervene manually if necessary. Before a termination of the automatic controlling of the lateral and longitudinal guidance, the driver is automatically prompted, in particular with a sufficient time reserve, to take over the task of driving (control of lateral and longitudinal guidance of the motor vehicle). If the driver does not take over the driving task, the system automatically returns to a minimum-risk state. Limits of the automatic controlling of the transverse and longitudinal guidance are automatically recognized. In all situations, it is possible to automatically return to a minimum-risk system state.

The terms "assist" and "support" can be used synonymously.

"At least one" means "one or more."

The motor vehicle is for example set up to be driven in at least partially automated fashion. The motor vehicle is, for example, an AVP motor vehicle. In particular, such a motor vehicle is set up to carry out an AVP operation.

An environmental sensor in the sense of the present description is, for example, one of the following environmental sensors: radar sensor, video sensor, in particular a video sensor of a video camera, for example video sensor(s) of a stereo video camera, ultrasonic sensor, lidar sensor, magnetic field sensor, and infrared sensor.

According to one specific embodiment of the present invention, the design described herein is applied to a plurality of areas of the parking facility. In particular, this means that when the singular is used for the area of the parking facility, the plural should always be read along with it, and vice versa.

The specific embodiments and exemplary embodiments of the present invention described in the present description can be combined with each other in any form, even if this is not explicitly described.

According to one specific embodiment of the present invention, the method is, according to the first aspect, a computer-implemented method.

Technical functionalities of the method according to the first aspect result analogously from corresponding technical functionalities of the device according to the second aspect, and vice versa.

In one specific embodiment of the present invention, the method according to the first aspect is executed or carried out by the device according to the second aspect.

Exemplary embodiments of the present invention are shown in the figures and explained in more detail in the following description.

DETAILED DESCRIPTION OF EXAMPLE EMBODIMENTS

Figure 1:
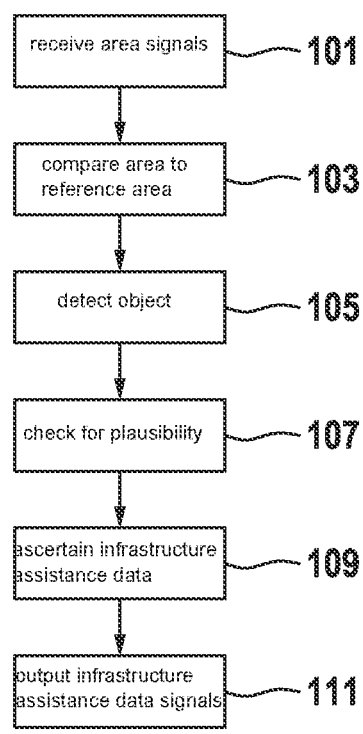
FIG. 1 shows a flowchart of a method for infrastructure-supported assisting of a motor vehicle, according to an example embodiment of the present invention.

In the following, identical reference characters may be used for identical features.

FIG. 1 shows a flowchart of a method for the infrastructure-supported assistance of a motor vehicle during a trip guided in at least partially automated fashion within a parking facility, having the following steps:

Receiving 101 area signals representing an area of the parking facility at an instantaneous time, Comparing 103 the area to a reference area associated with the area in order to recognize a change between the area and the reference area, Detecting 105 an object located in the area, if a change is recognized between the area and the reference area, where, if an object situated in the area is recognized, its existence is checked 107 for plausibility, Ascertaining 109 infrastructure assistance data for infrastructure-supported assisting of the motor vehicle for a trip guided in at least partially automated fashion through the area, based on the checking of the existence of the object for plausibility, Outputting 111 infrastructure assistance data signals that represent the ascertained infrastructure assistance data.

Figure 2:
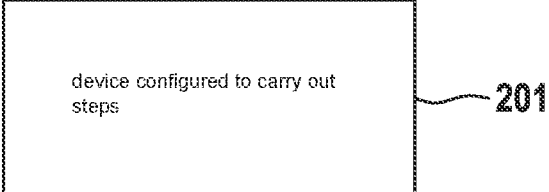
FIG. 2 shows a device according to an example embodiment of the present invention.

FIG. 2 shows a device 201 that is set up to carry out all the steps of the method according to the first aspect.

Figure 3:
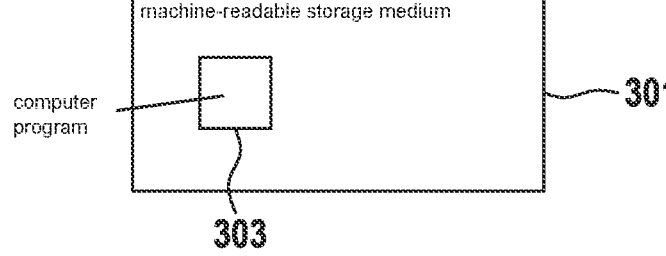
FIG. 3 shows a machine-readable storage medium, according to an example embodiment of the present invention.

FIG. 3 shows a machine-readable storage medium 301 on which a computer program 303 is stored.

Computer program 303 includes instructions that, when computer program 303 is executed by a computer, cause the computer to carry out a method according to the first aspect.

Figure 4:
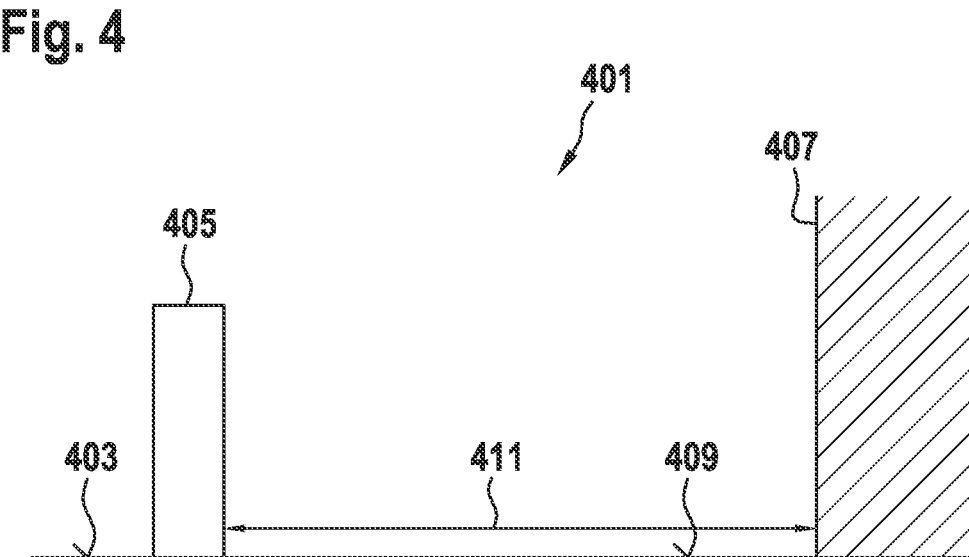
FIGS. 4 and 5 each show a first parking facility.

FIG. 4 shows a first parking facility 401 having a ground surface 403. A lidar sensor 405 is situated on the ground 403. A wall 407 of first parking facility 401 is provided opposite lidar sensor 405. Ground 403 between lidar sensor 405 and wall 407 is additionally provided with reference character 409 and indicates a driving surface of parking facility 401.

Thus, lidar sensor 405 can monitor a driving surface 409 as an area of parking facility 401.

Lidar sensor 405 can measure a first distance 411 between itself and wall 407.

Figure 5:
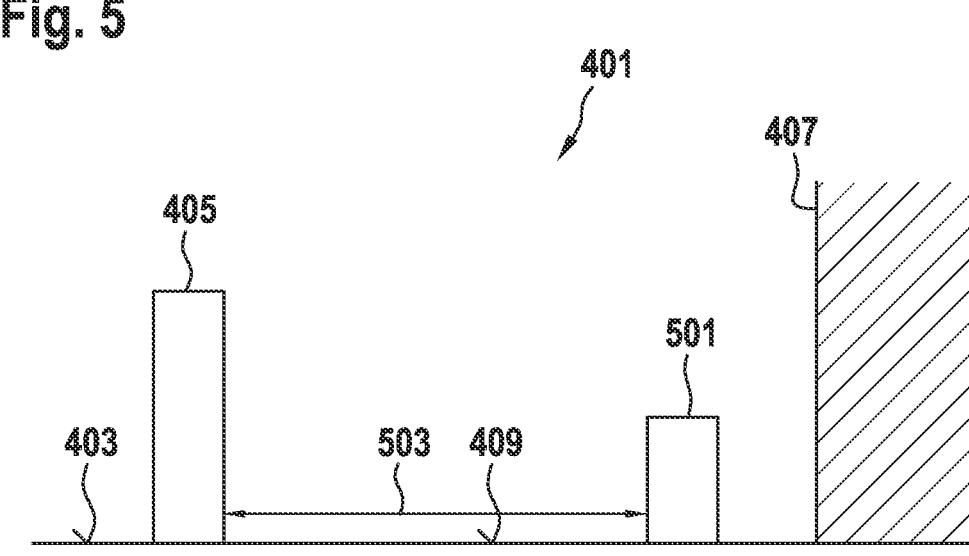

FIG. 5 shows first parking facility 401 according to FIG. 4, in which, as a difference, an object 501 is situated on driving surface 409. In this case, lidar sensor 405 measures a second distance 503 between itself and object 501. Object 501 is located between lidar sensor 405 and wall 407.

Thus, second distance 503 is smaller than first distance 411.

First distance 411 is the reference distance, so that when there is a comparison of first distance 411 and second distance 503, it is determined that there is a change. In this way, object 501 is detected by lidar sensor 405.

According to the design described here, it is provided that the existence of the detected object 501 is plausibilized before detected object 501 is used as a basis for ascertaining infrastructure assistance data.

An example of how this check can be carried out is explained below in connection with FIG. 8.

Figure 6:
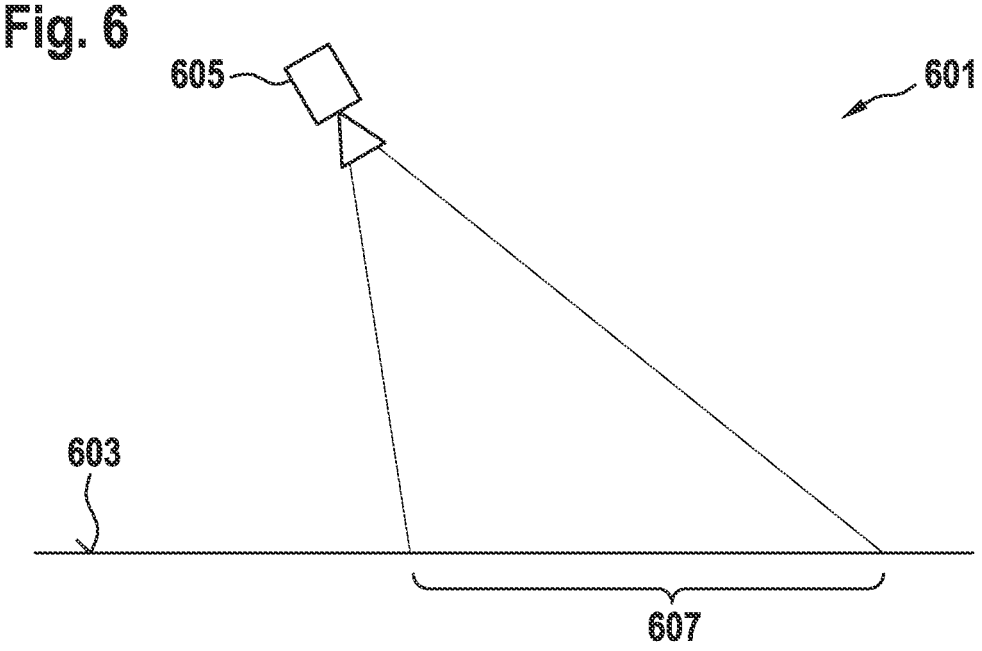
FIGS. 6 and 7 each show a second parking facility.

FIG. 6 shows a second parking facility 601 having a ground surface 603. A camera 605, which captures an area 607, is located within parking facility 601. There is currently no object situated within area 607, so the image data corresponding to the acquisition are used as a reference.

Figure 7:
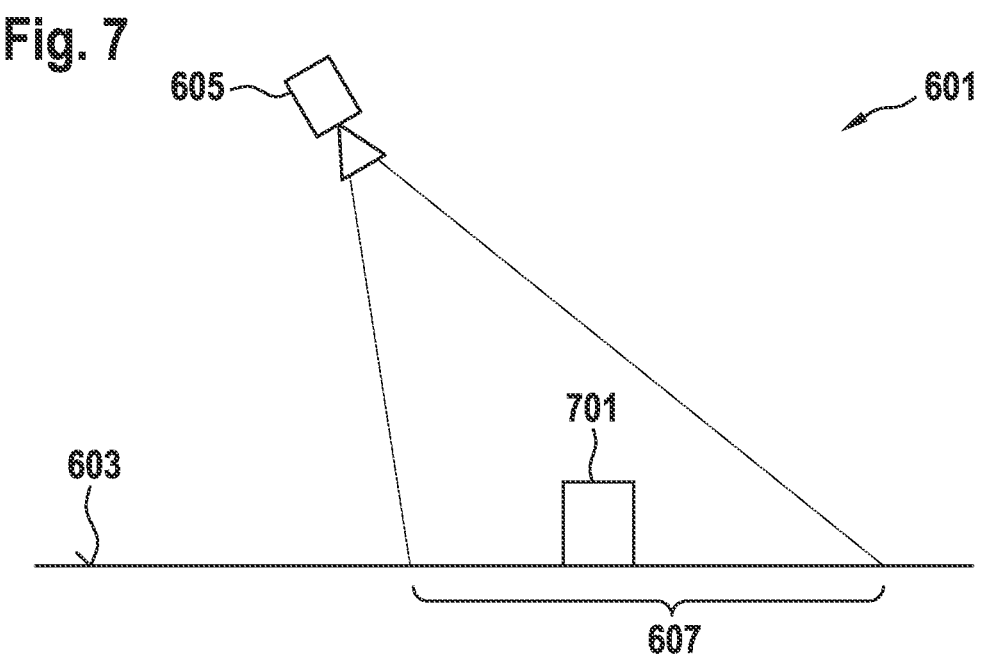

FIG. 7 shows second parking facility 601, with an object 701 located within area 607. The image data provided based on the acquisition of object 701 by camera 605 are compared with the above reference, and a difference or change is recognized based on object 701. In this way, object 701 is detected by camera 605.

The existence of this object 701 is plausibilized according to the design described herein before detected object 701 is used as a basis for ascertaining infrastructure assistance data.

Figure 8:
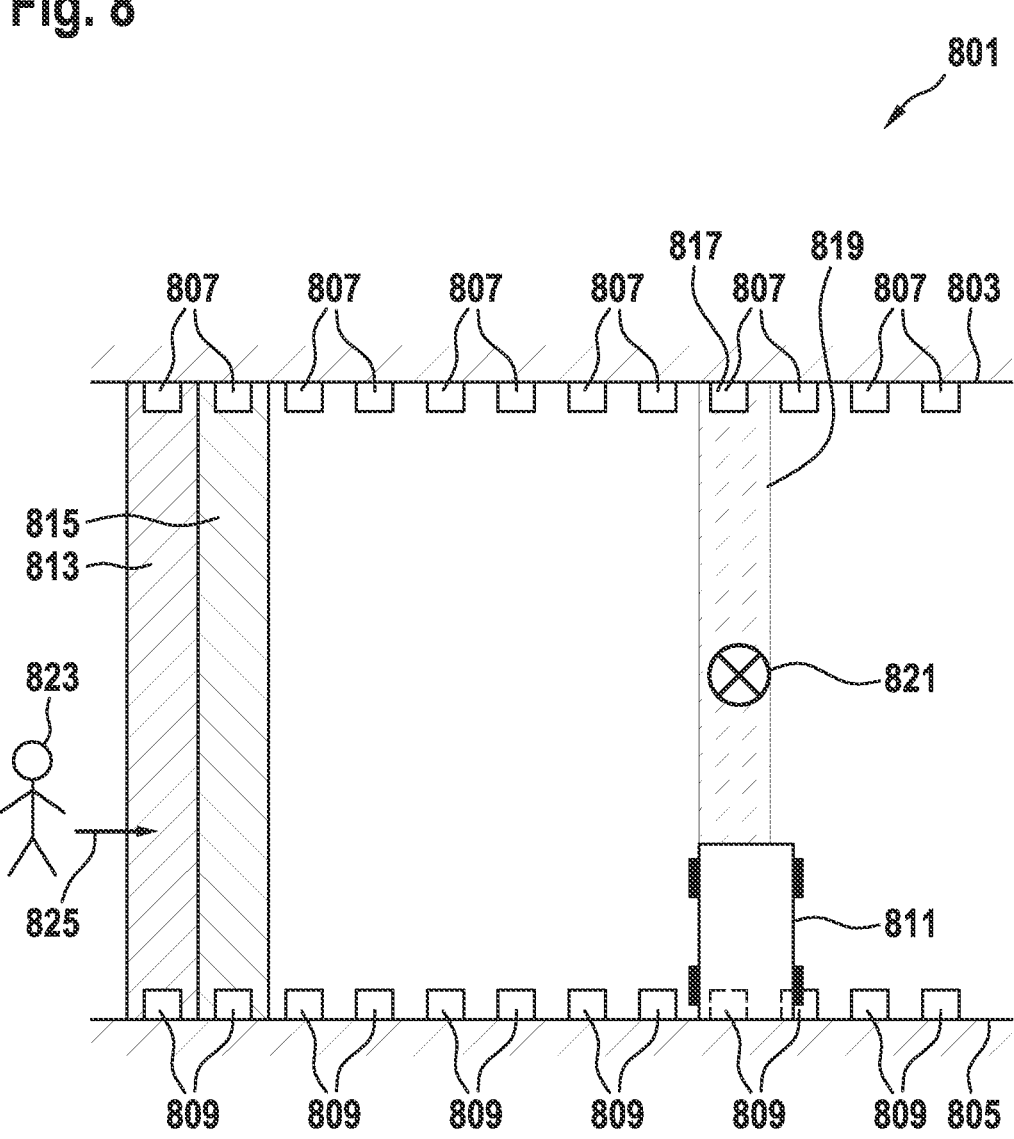
FIG. 8 shows a third parking facility.

FIG. 8 shows a third parking facility 801 in a schematic plan view from above. Shown are two oppositely situated walls: a first wall 803 and a second wall 805. A plurality of environmental sensors 807 are situated on first wall 803. Opposite the plurality of environmental sensors 807, additional environmental sensors 809 are situated on second wall 805.

Thus, environmental sensors 807, 809 can acquire areas of parking facility 801 and monitor them accordingly. These areas may partially overlap, for example. This means that immediately adjacent areas may overlap, for example.

A motor vehicle 811 is parked at second wall 805, at a right angle to second wall 805. Environmental sensor 807, which is situated opposite motor vehicle 811 on first wall 803, is additionally identified by reference character 817. This environmental sensor 817 detects, from its point of view, an object 821 located immediately in front of motor vehicle 811. This environment sensor 817 thus acquires an area 819, identified by a hatching.

This detection of object 821 is carried out analogously to the preceding and/or following embodiments.

The design described herein provides a plausibility check of the detected object 821. As an example, it is provided that it is checked whether object 821 has also been acquired by other environmental sensors 807, 809. Here, it is checked, for example, whether there have been changes within checking areas 813, 815, indicated by hatching, which have been acquired by the corresponding environmental sensors 807, 809. For example, a pedestrian 823 may have walked in the direction of arrow 825, i.e., from left to right with respect to the plane of the drawing, through checking areas 813, 815 in the direction of motor vehicle 811. Thus, older data are available here, i.e. the checking area signals, based on which it can be checked whether object 821 has been detected in the past by other environmental sensors 807, 809. In this case, the existence of object 821 is plausible, so that it is determined for example that object 821 is real.

If, in contrast, environmental sensors 807, 809 have not detected a corresponding change at the older time, then it is determined for example that detected object 821 is not a real object.

In one specific embodiment, the steps of receiving area signals, comparing the area with a reference area assigned to the area, detecting an object located in the area if a change between the area and the reference area is recognized, and checking the existence of an object located in the area for plausibility are repeated permanently, independently of whether a motor vehicle is to be assisted with infrastructure support during a trip within the parking facility guided in at least partially automated fashion.

"Permanently" means in an ongoing manner, which can mean, for example, 24 hours a day, 7 days a week, and 365 days a year.

In one specific embodiment, all parking and driving areas are monitored using the environmental sensors of the parking facility.

This makes it possible to ascertain over time whether it is at all possible for an object to be at a particular location. Thus, using the environmental sensors and over time, it is ascertained in particular whether an object has moved to a particular location, e.g. whether a pedestrian has walked from the entrance to a motor vehicle.

If the areas are analyzed over time and their course, then it can be ascertained whether an object can be in front of the motor vehicle. If, based on the environmental sensors, no changes have been ascertained previously in relation to the reference areas, then it cannot be that there is an object in front of the motor vehicle, especially not an object that can be injured from a functional safety point of view, such as a baby situated there, for example.

In one specific embodiment, the area is additionally analyzed using further data, for example opening times of the parking facility and/or the current time and/or current date and/or parking duration of the motor vehicle.

For example, if a motor vehicle has been parked for a very long time (e.g., several hours, days), it is improbable that a person will get out of a motor vehicle and be detected, for example, in front of the motor vehicle or another motor vehicle.

For example, it is very improbable that an object will be detected as new at night when the parking facility is closed, such as a closed parking garage. Historical data and/or e.g. opening data of an entrance gate of the parking facility and/or opening times of the parking facility can be used.

In one specific embodiment, the object can be classified. For example, this can be done using standard analysis methods and/or AI methods ("AI" stands for "Artificial Intelligence"). This means, for example, that it is ascertained not only that an object is there, but also what kind of object it (probably) is. For example, human, bicycle, animal, etc. That is, a classification of the object is carried out.

What is claimed is:

1. A method for infrastructure-supported assisting of a motor vehicle during a trip guided in at least partially automated fashion within a parking facility, comprising the following steps:

receiving area signals representing an area of the parking facility at an instantaneous time;

comparing the area to a reference area associated with the area to recognize a change between the area and the reference area;

detecting an object located in the area when a change is recognized between the area and the reference area;

based on detecting the object located in the area, checking existence of the object for plausibility;

ascertaining infrastructure assistance data for infrastructure-supported assisting of the motor vehicle for a trip guided in at least partially automated fashion through the area based on the checking of the existence of the object for plausibility; and outputting infrastructure assistance data signals that represent the ascertained infrastructure assistance data, wherein, when the object is located in the immediate vicinity of a parked motor vehicle, the checking of the existence of the object for plausibility is carried out based on a parking duration of the parked motor vehicle, the parking duration indicating how long the motor vehicle has already been parked and/or will continue to be parked.

2. A method for infrastructure-supported assisting of a motor vehicle during a trip guided in at least partially automated fashion within a parking facility, comprising the following steps:

receiving area signals representing an area of the parking facility at an instantaneous time;

comparing the area to a reference area associated with the area to recognize a change between the area and the reference area;

detecting an object located in the area when a change is recognized between the area and the reference area;

based on detecting the object located in the area, checking existence of the object for plausibility;

ascertaining infrastructure assistance data for infrastructure-supported assisting of the motor vehicle for a trip guided in at least partially automated fashion through the area based on the checking of the existence of the object for plausibility; and outputting infrastructure assistance data signals that represent the ascertained infrastructure assistance data, wherein the checking of the existence of the object for plausibility is carried out based on opening times and/or on door opening times of an entry gate of the parking facility.

3. A method for infrastructure-supported assisting of a motor vehicle during a trip guided in at least partially automated fashion within a parking facility, comprising the following steps:

receiving area signals representing an area of the parking facility at an instantaneous time;

comparing the area to a reference area associated with the area to recognize a change between the area and the reference area;

detecting an object located in the area when a change is recognized between the area and the reference area;

based on detecting the object located in the area, checking existence of the object for plausibility;

ascertaining infrastructure assistance data for infrastructure-supported assisting of the motor vehicle for a trip guided in at least partially automated fashion through the area based on the checking of the existence of the object for plausibility; and outputting infrastructure assistance data signals that represent the ascertained infrastructure assistance data; and classifying the object, and the infrastructure assistance data being ascertained based on the classification.

4. A device configured for infrastructure-supported assisting of a motor vehicle during a trip guided in at least partially automated fashion within a parking facility, the device configured to:

receive area signals representing an area of the parking facility at an instantaneous time;

compare the area to a reference area associated with the area to recognize a change between the area and the reference area;

detect an object located in the area when a change is recognized between the area and the reference area;

based on detecting the object located in the area, check existence of the object for plausibility;

ascertain infrastructure assistance data for infrastructure-supported assisting of the motor vehicle for a trip guided in at least partially automated fashion through the area based on the checking of the existence of the object for plausibility; and output infrastructure assistance data signals that represent the ascertained infrastructure assistance data, and one of:

(i) wherein, when the object is located in the immediate vicinity of a parked motor vehicle, the checking of the existence of the object for plausibility is carried out based on a parking duration of the parked motor vehicle, the parking duration indicating how long the motor vehicle has already been parked and/or will continue to be parked;

(ii) wherein the checking of the existence of the object for plausibility is carried out based on opening times and/or on door opening times of an entry gate of the parking facility; or (iii) classifying the object, and the infrastructure assistance data being ascertained based on the classification.

5. A non-transitory machine-readable storage medium on which is stored a computer program for infrastructure-supported assisting of a motor vehicle during a trip guided in at least partially automated fashion within a parking facility, the computer program, when executed by a computer, causing the computer to perform the following steps:

receiving area signals representing an area of the parking facility at an instantaneous time;

comparing the area to a reference area associated with the area to recognize a change between the area and the reference area;

detecting an object located in the area when a change is recognized between the area and the reference area;

based on detecting the object located in the area, checking existence of the object for plausibility;

ascertaining infrastructure assistance data for infrastructure-supported assisting of the motor vehicle for a trip guided in at least partially automated fashion through the area based on the checking of the existence of the object for plausibility; and outputting infrastructure assistance data signals that represent the ascertained infrastructure assistance data, and one of:

(i) wherein, when the object is located in the immediate vicinity of a parked motor vehicle, the checking of the existence of the object for plausibility is carried out based on a parking duration of the parked motor vehicle, the parking duration indicating how long the motor vehicle has already been parked and/or will continue to be parked;

(ii) wherein the checking of the existence of the object for plausibility is carried out based on opening times and/or on door opening times of an entry gate of the parking facility; or (iii) classifying the object, and the infrastructure assistance data being ascertained based on the classification.

* * * * *